Patented May 11, 1948

2,441,518

UNITED STATES PATENT OFFICE 2,441,518

PREPARATION OF ARYLALIPHATIC AMINES

Chester M. Suter, Albany, N. Y., and Arthur W. Weston, Waukegan, Ill., assignors to Sharp & Dohme, Incorporated, Philadelphia, Pa., a corporation of Maryland No Drawing. Application August 4, 1945, Serial No. 609,028

8 Claims. (Cl. 260—570.8)

This invention is concerned with arylaliphatic amines in which the aryl group is attached to a tertiary or quaternary carbon and to their preparation by direct condensation of an aromatic compound (having at least one replaceable hydrogen attached to its aromatic nucleus and having attached to the aromatic nucleus no radical or combination of radicals that is predominately meta-directing) with an unsaturated aliphatic amine in the presence of a condensing agent which brings about the saturation of the double bond of the aliphatic amine by a replaceable hydrogen linked to an aryl-nuclear-carbon attaching itself to one of the carbon atoms at the double bond of the unsaturated aliphatic amine and the resulting aryl radical attaching itself through the same nuclear carbon to the other carbon at the double bond of the aliphatic amine.

We have found that such arylaliphatic amines in which the aryl group is attached to a tertiary or quaternary carbon can be prepared in one step by condensing an aromatic compound of the type above described directly with an unsaturated, straight or branched chain, aliphatic amine having its unsaturation beyond at least the second carbon from the amino nitrogen, in the presence of a condensing agent causing the saturation of the aliphatic double bond by the addition to one of the carbons located at the double bond of a replaceable hydrogen atom removed from one of the nuclear carbons of the aromatic compound and by the addition of the resulting aryl radical to the other carbon at the double bond of the aliphatic amine. Such suitable condensing agents in addition to being of the Friedel-Crafts group or type are selected within said group from the halides of the solid elements, among which especially advantageously applicable are the aluminum halides, for example, aluminum chloride, aluminum bromide and the like, while also included are the other metallic halides of the Friedel-Crafts group such as the halides of the other amphoteric metals in addition to the aluminum halides, such as zinc chloride and stannic chloride.

The aromatic compound suitable as a starting material in the process of the invention is not limited to any subgeneric group of aromatic compounds, so long as the starting aromatic compound (a) has at least one replaceable (that is, chemically) hydrogen attached to an aromatic ring carbon, and (b) any sole substituent on the aromatic nucleus having the reactive hydrogen is not meta-directing, or any combination of substituent radicals on such aromatic nucleus is not predominately meta-directing. Accordingly, the aromatic starting material may be generically represented by Ar·H, in which Ar is an aromatic radical such as that derived by removing a hydrogen from (I) an aromatic hydrocarbon selected from those that are (A) unsubstituted and (1) mono-nuclear as benzene, or (2) poly-nuclear and (a) linked binuclear as biphenyl, or (b) fused polynuclear as naphthalene, anthracene, pyrene, perylene, naphthonaphthacene, coronene, and the like, or (B) hydrocarbon-substituted, mono- or poly-nuclear as any of the above containing on the aromatic nucleus, for example, not more than four straight or branched chain alkyl groups, as in the alkyl-benzenes as toluene, ethyl benzene, xylene, cumene, mesitylene, or the alkyl-naphthalenes, as methylnaphthalene, dimethylnaphthalene, and the like, or from (II) an other than hydrocarbon substituted aromatic compound of the type indicated, mono- or poly-nuclear, having, for example, less than 3 halogen radicals, or less than 4 hydroxy or alkoxy groups, such as chloro-, bromo-, or fluoro-benzene, hydroxybenzenes as phenol, resorcinol, catechol, hydroxynaphthalenes as alpha- or beta-naphthol, alkoxybenzenes as anisole, alkoxy-naphthalenes as beta-ethoxynaphthalene, and the like.

Thus the applicable aromatic starting material includes not only mono- and poly-nuclear, unsubstituted aromatic compounds as benzene, naphthalene, and the like but also the aromatic compounds that are mono- or poly-substituted as mono- or poly-substituted by radicals such as alkyl, straight or branched chain, such as lower alkyl as methyl, ethyl, propyl, isopropyl, and the like, halogen, hydroxy, alkoxy such as lower alkoxy as methoxy, ethoxy, and the like, or even higher alkoxy, for example, hexadecoxy, octadecoxy and the like, or other substituent radicals, or compounds of any of them, so long as any sole substituent radical is not meta-directing or any combination of any of the indicated substituent radicals is not predominately meta-directing.

Then, any straight or branched chain, olefinic amine may be used as the second (or aliphatic amine) starting material, which alkylene amines may be represented by the general formula

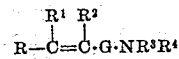

in which R is an aliphatic radical such as an aliphatic hydrocarbon radical as an alkyl radical, for example, methyl, ethyl, amyl, octyl, decyl, or an alkylene radical as ethylene, propylene and the like, and $R^1$ and $R^2$ may be separately hydrogen, an alkyl radical such as methyl, ethyl, propyl, and the like, or a halogen as chlorine, bromine, and the like, and R³ and R⁴ may be separately hydrogen or an alkyl radical such as for R¹, and in which G is a divalent grouping selected from the class of

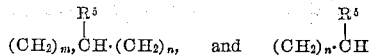

in which $m$ may be one or a small whole number, such as up to about ten or so, and $n$ is zero or a like small whole number, and R⁵ is an alkyl radical as methyl, ethyl, propyl and the like, or a halogen radical. The suitable olefinic amines include those that are mono-olefinic as well as those that are di-olefinic or conjugated-olefinic. The mono-olefinic amines are exemplified by, but not restricted to, those that are unsubstituted or substituted straight or branched chain. Allylamine, crotylamine, undecenylamine, and the like illustrate the unsubstituted, straight chain type. The substituted mono-olefinic amines include those substituted on the aliphatic portion of the molecule as well as those substituted in the amino group, the first of which is illustrated by the alkyl-substituted allylamines as the methallylamines as alpha-methallylamine and the like, and other alkyl-substituted alkenylamines as (alpha - allyl-) ethylamine, and (beta - allyl-) - ethylamine and the like, some of which alkyl-substituted examples illustrate also the branched chain type. The substituted mono - olefinic amines are further illustrated by the halogen-substituted alkenylamines or halo-alkenylamines as gamma - chloro - N - diethylallylamine, beta-chloro-N-methylallylamine, beta-bromo-N-methylallylamine, beta-bromo-N-dimethylallylamine, and the like. The last four halo-alkenylamines illustrate also the type that is substituted in the amino group as those that are mono- and dialkyl substituted on the amino group, among which also are included the N-(mono- and di-)alkylallylamines as allylmethylamine, allyldimethylamine and the like, as well as other N-(mono- and di-)alkylalkenylamines as delta-butenyl-N-dimethylamine, delta-pentenyl-N-dimethylamine, the formulae of the latter two being respectively CH₂:CH(CH₂)₂N(CH₃)₂ and CH₂:CH(CH₂)₃N(CH₃)₂, as well as diallylamine, and the like. The di-olefinic amines are not limited to any particular type such as the cumulative or the conjugated or isolated, and are exemplified by the cumulative butadienylamines as 1,2-butadienylamine-4 and 2,3-butadienylamine-4, and the conjugated unsaturated amines, for example, of the formula $$RCH=CHCH=CHNH_2$$

as the corresponding butadienylamines, and the like.

The reaction may be illustrated by, but not restricted to, the following examples:

*Example 1.—Beta-methylphenethylamine.*—A mixture of 80.1 g. (0.6 mole) of anhydrous aluminum chloride and 78.0 g. (1 mole) of benzene was placed in a 200 cc. three-necked flask fitted with a mercury-sealed stirrer, thermometer and a T-tube which carried a dropping funnel and served as a gas outlet. The flask was cooled in an ice bath and a solution of 11.4 g. (0.2 mole) of allylamine in an equal volume of benzene was slowly added. An exothermic reaction ensued and some hydrogen chloride was evolved. Since no coloration was observed, the bath was removed and the reaction mixture was allowed to become warm (50° C.). The mixture was cooled to 38° C. where the temperature remained for ten or more minutes. Since the temperature then began to fall, the flask was heated to 83–84° C. (at which point the benzene refluxed) for six hours.

After standing overnight, the contents which had assumed a brown color, were hydrolyzed on ice. The dark benzene layer was separated and the aqueous acid portion was extracted once with ether to remove any coloring matter. The aqueous solution was made alkaline with strong sodium hydroxide (30%) and the first-precipitated aluminum hydroxide dissolved in excess alkali, ice being added to keep the mixture cold. The amine layer which had formed was separated and the aqueous portion was extracted three times with ether. The combined extracts were carefully separated from water, the ether then being removed on the steam bath and the combined residual brown oil portions then distilled to obtain 25.2 g., a 93.5% yield, of the pure amine, having the physical constants $n_D^{20}$, 1.5255; B. Pt. 91° C. at 17 mm., 89–90° C. at 15 mm., 101° C. at 23 mm. The above procedure is graphically illustrated thus:

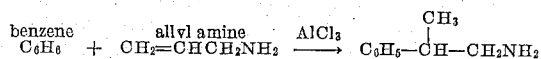

*Example 2.—Beta-beta-dimethyl phenethylamine.*—By replacing the allylamine of Example 1 by the equivalent amount of methallylamine, by similar procedure there was obtained beta-beta-dimethyl phenethylamine,

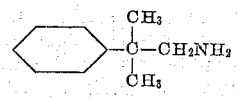

boiling at 75–76° C. at 5 mm.; $n_D^{20}$, 1.5238; $d_4^{20}$, 0.9495; yield 84%.

*Beta-beta-dimethyl phenethylamine hydrochloride.*—The hydrochloride was prepared from the amine by passing hydrogen chloride gas into an ether solution of the amine and recovering the hydrochloride in the usual manner. Its melting point is 200–201.5° C.

By replacing the allyl amine in Example 1 by the stoichiometric equivalent amount of diallylamine and preferably increasing the molal proportion of both the anhydrous aluminum chloride and the benzene by fifty per cent or more, and by similar procedure to that of Example 1, there is obtained a mixture of bis-(beta-methylphenethyl) amine and N-allyl-beta-methylphenethylamine.

*Example 3.—Beta-methyl-p-fluorophenethylamine.*—To a mixture of 80.1 g. (0.6 mole) of anhydrous aluminum chloride and 57.6 g. (0.6 mole) of fluorobenzene contained in a flask equipped as in Example 1, was added 11.4 g. (0.2 mole) of allylamine in an equal volume of fluorobenzene. The addition temperature was maintained at 20–25° C. The mixture was then heated at 90–95° C. (internal temperature) for six hours.

The dark reaction product was hydrolyzed on ice giving an emulsion which was then made sufficiently alkaline to dissolve the aluminum hydroxide first precipitated, and then extracted several times with ether. The amine was removed from the ether by shaking with four portions of dilute sulfuric acid. The free amine was released by the addition of alkali, extracted with ether, and after removal of the solvent, the light brown oil was fractionated, yielding 18.1 g., or 59%, of the pure amine, having these constants: B. Pt. 105–106° C. at 22 mm.; $d_4^{20}$, 1.048; $n_D^{20}$, 1.5066. The reaction is illustrated thus:

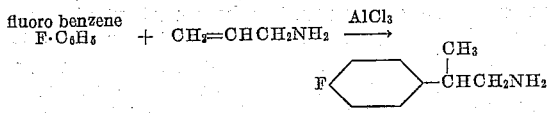

*Beta-methyl-p-fluorophenethylamine hydrochloride.*—The amine was converted to the hydrochloride as in Example 2, M. Pt. 146–148° C. The salt was soluble in ethyl acetate, chloroform, acetone, and insoluble in petroleum ether. It crystallized from carbon tetrachloride in silvery plates M. Pt. 147.5–149° C. A second purification gave material which after drying in the Abderhalden melted at 149–150° C. The salt is somewhat hygroscopic.

By replacing the fluorobenzene of Example 3 by the stoichiometric equivalent amount of chlorobenzene, by similar procedure there is obtained beta-methyl-p-chlorophenethylamine having boiling point of 130–132° C. at 22 mm., 81–82° C. at 1 mm.;

$d_{20}^{20}$, 1.1043; $n_D^{20}$, 1.5430

By proceeding similarly after replacing the fluorobenzene of Example 3 by bromobenzene, there is obtained beta-methyl-p-bromo-phenethylamine.

*Example 4.—Beta-methyl-(o- and p-)methylphenethylamine.*—To a mixture of 80.1 g. (0.6 mole) of anhydrous aluminum chloride and 92 g. (1 mole) of toluene contained in a flask equipped as in Example 1, was added slowly 11.4 g. (0.2 mole) of allylamine in an equal volume of toluene. The addition temperature was maintained at 15–20° C. After all the amine had been added, the ice-bath was removed whereupon the temperature rose slowly to 48° C. over a period of an hour and then slowly fell. After stirring overnight, the product was hydrolyzed on ice, the toluene layer being removed and the aqueous portion extracted with ether. After the addition of sufficient alkali to dissolve the first-precipitated aluminum hydroxide the amine was extracted three times with ether, dried over sodium sulfate and distilled, to obtain 26.8 g., a 90% yield of a mixture of beta-methyl-(p-methyl-)-phenethylamine and beta-methyl(o-methyl)-phenethylamine having these constants; B. Pt. 116–117° C. at 22 mm.; $d_4^{20}$, 0.9417; $n_D^{20}$, 1.5241. The reaction is illustrated thus:

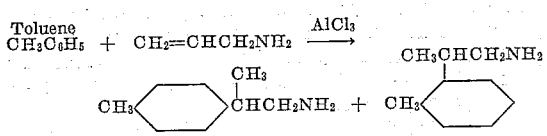

*Example 4a.—Beta-methyl-2,5-dimethyl-phenethylamine.*—After replacing the toluene of Example 4 by the stoichiometrically equivalent amount of para-xylene and following the procedure of Example 4 through the removal of the ice bath the mixture, was heated at 93° C. for five and one-half hours and allowed to stand overnight without further heating. The contents were hydrolyzed on ice and when the oily portion separated, a small quantity of fine, lacey crystals were in the region of the interface. The oily layer was separated and the crystals were collected on a filter. The aqueous layer was allowed to stand overnight and more crystals formed. These crystals were dissolved in water; the resulting solution was made alkaline with 50% sodium hydroxide solution and extracted with ether. The acid solution from the hydrolysis was also made alkaline with excess 50% sodium hydroxide solution and extracted with ether. The extracts were combined, dried with anhydrous sodium sulfate, and the ether was distilled off. The residue, the crude amine, was distilled under reduced pressure yielding the amine boiling at 82–84° C. at 2 mm.;

$d_{20}^{20}$, 0.9450 and $n_D^{20}$, 1.5252. On converting the amine as shown in earlier examples to the hydrochloride, the latter melted at 172–173° C.

*Example 4b.—Beta-methyl - 2,4(?) - dimethylphenethylamine.*—With meta-xylene and procedure similar to that of Example 4a, there is obtained beta-methyl-2,4(?)-dimethylphenethylamine having boiling point of 115–117° C. at 12 mm.; $d_4^{20}$, 0.9354;

$d_{20}^{20}$, 0.9371

$n_D^{20}$, 1.5425. The amine was converted to the hydrochloride having melting point of 193–194° C.

The above procedure was repeated using as a solvent 130 cc. of orthodichlorobenzene as inert solvent, in which case the yield of the amine was 53%. The solvent did not enter into the reaction because of the preferential activity between the meta-xylene and the allylamine under the reaction conditions. In the absence of the meta-xylene, reaction occurs with the chlorobenzene, particularly upon increasing the temperature well above 98° C. or together with increasing the time of heating.

*Example 4c.—Beta-methyl-p-ethyl-phenethylamine.*—Following substantially the procedure of Example 4, there was added to a cold mixture of 80.1 g. (0.6 mole) of anhydrous aluminum chloride and 200 cc. of orthodichlorobenzene were added slowly 11.4 g. (0.2 mole) of allylamine in an equal volume of ortho-dichlorobenzene. A solution of 54 g. (0.5 mole) of ethyl benzene in 200 cc. of ortho-dichlorobenzene was then added rapidly and the mixture heated on a steam bath at a temperature of 50° C. in the mixture for 4½ hours and then at 98° C. for 1 hour. The reaction mixture was then worked up as in the preceding examples and the amine obtained boiled at 90–100° C. at 20 mm. and showed $n_D^{20}$, 1.5209.

Repeating the experiment with ethylbenzene but without heating the reaction mixture on the steam bath and instead stirring it at room temperature for 4 hours, the yield was only 60% of that obtained in the experiment in which heating was used.

*Example 4d.—Beta-methyl - 2,4,6 - trimethylphenethylamine.*—Following the procedure as in experiments 4 and 4a and using 20 g. (0.166 mole) of mesitylene, 1.88 g. (0.033 mole) of allylamine, and 13.3 g. (0.099 mole) of anhydrous aluminum chloride, the indicated amine was obtained and converted to the hydrochloride as shown in preceding examples. The hydrochloride on recrystallization from ethyl acetate, acetone and water mixture melted at 233–236° C.

Other aromatic hydrocarbon starting materials which are alkyl benzenes can be reacted with allylamine and any of the other olefinic amines described herein by similar procedure to obtain the corresponding arylaliphatic amines having the aryl radical attached to a tertiary or quaternary carbon.

*Example 5.—N-n-butyl-beta-methylphenethylamine.*—In a flask equipped as in Example 1, to a mixture of 72 g. (0.54 mole) of anhydrous aluminum chloride in 70 g. (0.9 mole) of benzene, cooled in an ice-bath, was added 20.4 g. (0.18 mole) of N-n-butyl allylamine in an equal volume of benzene. After heating for 2½ hours at 45-50° C. the mixture was hydrolyzed on ice and the amine separated by neutralization of the aqueous solution with 30% sodium hydroxide. The yield of amine was 66.2%, boiling at 121.5-122.5° C. at 12 mm. The hydrochloride prepared by the reaction of hydrogen chloride gas with the amine in ether solution melted at 154-155.5° C. after recrystallization from a mixture of acetone in carbon tetrachloride.

*Example 6.—N-di-n-butyl-beta-methylphenethylamine.*—By substituting N-di-n-butyl allylamine for the N-n-butyl allylamine in Example 5 there was obtained N-di-n-butyl-beta-methylphenethylamine in a yield of about 45%, boiling at 148-149.5° C. at 12 mm.

By replacing the benzene of Examples 5 and 6 by each of the alkyl benzenes employed in preceding examples, by corresponding procedure there results the corresponding phenethylamine either n-butyl or di-(n-butyl) substitution on the amino nitrogen.

*Example 7.—N-methyl-beta-methylphenethylamine.*—In apparatus as in Example 1, six g. (0.08 mole) of allylmethylamine in an equal volume of benzene was reacted with a mixture of 33.5 g. (0.24 mole) of anhydrous aluminum chloride in 32 g. (0.04 mole) of benzene under the reaction conditions described above. The desired N-methyl-beta-methylphenethylamine was obtained in a yield of 56%, boiling at 84-85° C. at 9 mm. The hydrochloride melts at 144-145.5° C. after recrystallization from ethyl acetate.

*Example 8.—Beta-methyl-p-methoxy-phenethylamine.*—To 65 g. (0.6 mole) of anisole contained in a 20 cc. flask fitted as in the preceding examples and cooled in an ice bath was slowly added 80.1 g. (0.6 mole) of anhydrous aluminum chloride, at such a rate as to keep the temperature of the flask contents as nearly as possible well below room temperature, as considerable heat is otherwise evolved in this reaction and interferes with the yield. To this cold mixture was added also quite slowly 11.4 g. (0.2 mole) of allylamine in an equal volume of anisole. (Since heat is generated and some hydrogen chloride gas evolved, the rate of addition should be controlled so that the addition temperature is maintained at around 5-9° C. and preferably below.) After the final addition (at least 30 minutes having been consumed), the mixture was stirred at 10.12° C. for 10 hours. The product was hydrolyzed on ice and allowed to stand overnight, following the separation of the colorless anisole layer by extraction of the aqueous portion twice with ether. Sufficient alkali to dissolve the aluminum hydroxide was then added and 3 extractions with ether were then made. The extracts were combined, dried with anhydrous sodium sulfate, and the ether distilled off. Crude amine was distilled under reduced pressure.

By carefully regulating the temperature in the initial portions of this procedure during the addition of the aluminum chloride to the anisole to keep the temperature sufficiently low and seeing to it that the subsequent addition of the allylamine is made under conditions keeping the temperature sufficiently low and seeing to it that the proportion of the aluminum chloride is sufficient to cause the desired reaction and not too high to bring about any side reactions, the yield is improved and better controlled.

Biphenyl and allylamine are condensed together to give the corresponding beta-methyl-phenyl-phenethylamine by procedure paralleling that followed in the various preceding examples using, for example, 0.6 mole of anhydrous aluminum chloride possibly dispersed in 200 cc. of orthodichlorobenzene, 0.2 mole of allylamine (which could be added in possibly an equal volume of orthodichlorobenzene) and by rapid addition of about 0.5 mole of biphenyl in up to about 200 cc. of orthodichlorobenzene. Here also the action is preferential to the biphenyl over the dichlorobenzene.

In manner similar to that disclosed in the various examples, the hydroxy substituted aromatic hydrocarbon can be condensed with allylamine or any of the other disclosed and described olefinic amines to give the corresponding aryl aliphatic amine with the aryl group attached to a tertiary or quaternary carbon. Thus, according to procedures described, such as those where benzene, alkyl- or halo-substituted benzenes are reacted with allylamine or a substituted allylamine, phenol can be similarly reacted with allylamine to obtain the corresponding beta-methyl-hydroxyphenethylamine.

*Example 9.—Beta - methyl - naphthylethylamine.*—A mixture of 128.2 g. (1 mol) of naphthalene and 80.1 g. (0.6 mol) of anhydrous aluminum chloride was placed in a 500 cc. three-necked flask fitted with a mercury-sealed stirrer, thermometer, dropping funnel, and reflux condenser protected with a drying tube. The flask was heated on a steam bath until the naphthalene was melted, then 11.4 g. (0.2 mol) of allylamine were added slowly. The mixture was then heated on a steam bath at 95° for two and one-half hours. The mixture was cooled, the solid residue was filtered off and the filtrate made strongly alkaline with 30% sodium hydroxide solution. The alkaline solution was extracted with four 100 cc. portions of ether, the ether solution was dried with anhydrous magnesium sulfate, and the ether distilled off. The amine was dissolved in anhydrous ether, and dry hydrogen chloride was passed into the solution. The hydrochloride, recrystallized from ethyl acetate and dried, did not melt, but decomposed at 264-267° C.

By procedure similar to the last example or to other examples described, the corresponding hydroxynaphthylethylamine is obtained by replacing the naphthalene in the preceding example or the aromatic reactant in any other example by the suitable hydroxynaphthalene necessary to obtain the desired hydroxy(mono- or poly) naphthylethylamine.

While the process of the invention has been illustrated in the several examples showing the use of a particular aromatic compound starting material and a particular olefinic amine, any olefinic amine of the type described including those specifically identified herein may be used as a selected starting material reactant with any aromatic compound of the type described or of any specifically named herein to obtain the corresponding end product by following substantially the applicable reaction conditions of the type described in the preceding examples. For example, suitable substitutions of other olefinic amines, such as those hereinabove disclosed and others, may be made for the amines employed in the specific illustrative examples to obtain the corresponding arylaliphatic amines in which the aryl group is attached to a tertiary or quaternary carbon such as gamma-methyl-gamma-phenyl-propylamine (from $CH_2=CHCH_2CH_2NH_2$), beta-ethyl-beta-phenyl-ethylamine (from $CH_3 \cdot CH=CHCH_2NH_2$)

Δ-methyl-Δ-phenyl-butylamine (from $CH_2=CHCH_2CH_2CH_2NH_2$)

and 10-methyl-10-phenyl-decylamine (from $CH_2=CH(CH_2)_8CH_2NH_2$)

N-diethyl-beta-chloromethyl-phenethylamine, and the like. As is noted from the particular examples, a solvent or dispersing medium, inert under the reaction conditions, for any or both of the essential reactants is not necessary or desired in every reaction. Use of such inert solvent or reaction medium can be considered when any of the reactants is solid at atmospheric conditions and may continue to remain solid at the ordinary temperature conditions that need be observed in the procedure as illustrated by the various examples. In some cases if one of the reactants while solid at atmospheric conditions may be liquid under the reaction conditions, an inert solvent or dispersing liquid may not be required. In other cases, it may be found that the use of such solvent or dispersing medium may be advantageous, in spite of that fact, either in improving the smoothness of the reaction procedure or the yield.

Where the aromatic compound is substituted by some substituent which under proper, different reaction conditions would react with the amino group, the reaction temperature in the procedure to obtain according to this invention an arylaliphatic amine having the aryl group attached to a tertiary or quaternary carbon, is kept below the temperature at which such substituent on the aromatic compound would react with the amino group, usually below about 200° C. or below about 180° C. and often substantially under that for, as noted from the several examples, the desired process of the invention operates efficiently at temperatures up to about 100° C.

While the method of the invention has been illustrated in the specific examples by the use of aluminum chloride as the condensing agent, the method of the invention proceeds particularly favorably in the presence of the aluminum halide condensing agents generally and also proceeds in the presence of the other condensing agents hereinabove described and specifically identified.

The various new arylaliphatic amines having the aryl group attached to a tertiary or quaternary carbon are suitable for various purposes in the arts including the preparation of therapeutically useful and physiologically active amines and also as intermediates.

In the specification and its appending claims, the term "substitutions" is used in the broad sense to relate not only to a single substituent on the aromatic nucleus but also to any combination of more than one substituent on such nucleus. Accordingly, the expression "meta-directing" in the claims is used in the broad sense to refer to any substituent on the aromatic nucleus when such sole substituent is meta-directing and also to relate to any combination of substituents on the aromatic nucleus when such combination of substituents is predominately meta-directing because of the stronger influence of any particular single meta-directing substituent on the nucleus. In the latter case the orientation effect would be to a position meta to the substituent responsible for the predominately meta-directing effect.

The term "olefinyl" herein and in the appending claims indicates the customary unsaturation by a double bond between the adjacent carbons in an aliphatic chain and is thus used in the broad sense as embracing the presence of not only one but also more than one double bond in the aliphatic substance. In the specification and claims the expression "beyond at least the second carbon" employed to locate the unsaturation in the olefinic amine reactant in the process of the invention designates as its language shows that there is not included any olefinic amine that has unsaturation only between the first and the second carbon atoms starting from the amino nitrogen and that there must be unsaturation at least between the second and third carbons from the amino nitrogen or any further removed from it.

This application is a continuation-in-part of our co-pending application Serial No. 441,354, filed May 1, 1942 which has become abandoned.

While the invention has been illustrated by certain specific embodiments of it, it is understood that substitutions and modifications may be made in it within the effective scope of the appending claims.

What is claimed is:

1. The preparation of an arylaliphatic amine, which comprises reacting, in the presence of an aluminum halide, (1) an aromatic compound which is a member of the group consisting of aryl hydrocarbons and haloaryl and alkoxyaryl compounds having at least one replaceable hydrogen linked to a ring carbon, with (2) an olefinic amine having the general formula

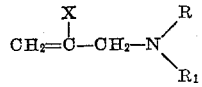

wherein X, R and $R_1$ are each separately and independently selected from hydrogen and an alkyl group.

2. The preparation of phenylaliphatic amines as claimed in claim 1, wherein the aluminum halide is anhydrous aluminum chloride.

3. The preparation of β-methyl-phenethylamine, which comprises reacting benzene with allyl amine in the presence of an aluminum halide.

4. The preparation of beta-methyl-phenethylamine, which comprises reacting benzene with allylamine in the presence of anhydrous aluminum chloride.

5. The preparation of N-methyl-β-methyl-phenethylamine, which comprises reacting benzene with allylmethylamine in the presence of an aluminum halide.

6. The preparation of N-methyl-β-methyl-phenethylamine, as claimed in claim 5, wherein the aluminum halide is anhydrous aluminum chloride.

7. The preparation of beta,beta-dimethyl-phenethylamine, which comprises reacting benzene with methallylamine in the presence of an aluminum halide.

8. The preparation of beta,beta-dimethyl-phenethylamine, as claimed in claim 7, wherein the aluminum halide is anhydrous aluminum chloride.

CHESTER M. SUTER.
ARTHUR W. WESTON.

(References on following page)

REFERENCES CITED

The following references are of record in the file of this patent:

UNITED STATES PATENTS

| Number | Name | Date |
|---|---|---|
| 1,970,353 | Albrecht | Aug. 14, 1934 |
| 2,006,114 | Rosenmund | June 25, 1935 |
| 2,134,712 | Flett | Nov. 1, 1938 |
| 2,246,762 | Schirm | June 25, 1941 |
| 2,257,148 | Ballauf | Sept. 30, 1941 |

FOREIGN PATENTS

| Number | Country | Date |
|---|---|---|
| 273,323 | Germany | Apr. 23, 1914 |

OTHER REFERENCES

Truffault: "Comptes Rendus," vol. 202, pages 1287–1289.

Chemical Abstracts, vol. 27 (1933), page 5065.

Thomas: "Anhydrous Aluminum Chloride in Organic Chemistry," (1941), pages 455–458 and 483.